(12) United States Patent
De Baere et al.

(10) Patent No.: US 11,547,048 B2
(45) Date of Patent: Jan. 10, 2023

(54) SPREADER SYSTEM FOR AN AGRICULTURAL HARVESTER WITH AN OSCILLATING DEFLECTOR

(71) Applicant: CNH Industrial America LLC, New Holland, PA (US)

(72) Inventors: Reinout De Baere, Maldegem (BE); Stefaan Desmet, Vosselare (BE); Frank R. G. Duquesne, Zwevegem (BE)

(73) Assignee: CNH Industrial America LLC, New Holland, PA (US)

( * ) Notice: Subject to any disclaimer, the term of this patent is extended or adjusted under 35 U.S.C. 154(b) by 419 days.

(21) Appl. No.: 16/492,245

(22) PCT Filed: Mar. 8, 2018

(86) PCT No.: PCT/EP2018/055834
§ 371 (c)(1),
(2) Date: Sep. 9, 2019

(87) PCT Pub. No.: WO2018/162680
PCT Pub. Date: Sep. 13, 2018

(65) Prior Publication Data
US 2020/0045883 A1   Feb. 13, 2020

(30) Foreign Application Priority Data

Mar. 9, 2017  (BE) .................................. 2017/5145

(51) Int. Cl.
*A01D 41/12* (2006.01)
(52) U.S. Cl.
CPC ................................ *A01D 41/1243* (2013.01)
(58) Field of Classification Search
CPC ..... A01D 41/1243; A01D 13/00; A01D 34/00
See application file for complete search history.

(56) References Cited

U.S. PATENT DOCUMENTS

| 6,406,368 B1 | 6/2002 | Cruson et al. |
| 7,086,942 B2 * | 8/2006 | Niermann .......... A01D 41/1243 460/111 |

(Continued)

FOREIGN PATENT DOCUMENTS

| DE | 102007037485 B3 | 1/2009 |
| EP | 0331784 A1 | 9/1989 |

(Continued)

OTHER PUBLICATIONS

PCT International Search Report for PCT application PCT/EP2018/055834, dated Jun. 6, 2018 (13 pages).

*Primary Examiner* — Manuel A Rivera Vargas
*Assistant Examiner* — Yaritza H Perez Bermudez
(74) *Attorney, Agent, or Firm* — Peter Zacharias; Patrick Sheldrake (57) ABSTRACT

A spreader system of an agricultural vehicle for spreading crop residue over a field includes a first spreader device including a plurality of first paddles configured to rotate about a first axis to define a first spread path; and a second spreader device including a plurality of second paddles configured to rotate about a second axis to define a second spread path. The second spreader device and the first spreader device are located side-by-side. The spreader system further includes deflector that include a first deflector portion for deflecting the first spread path and a second deflector portion for deflecting the second spread path. The spreader further includes a deflector driver connected to the deflector. The deflector driver is configured to move the first deflector portion and the second deflector portion of the deflector in a direction generally parallel to the first axis or the second axis in an oscillating pattern.

19 Claims, 6 Drawing Sheets

(56) References Cited

U.S. PATENT DOCUMENTS

| | | | | |
|---|---|---|---|---|
| 7,306,174 | B2* | 12/2007 | Pearson | A01D 41/1243 239/663 |
| 7,487,024 | B2* | 2/2009 | Farley | A01D 41/1243 701/50 |
| 8,010,262 | B2* | 8/2011 | Schroeder | A01D 41/1243 701/50 |
| 8,210,915 | B2* | 7/2012 | Holmen | A01F 12/40 460/112 |
| 9,066,470 | B2* | 6/2015 | Ricketts | A01D 41/1243 |
| 9,974,232 | B2* | 5/2018 | Shane | A01D 41/127 |
| 10,143,131 | B2* | 12/2018 | Isaac | A01D 41/127 |
| 10,398,081 | B2* | 9/2019 | Isaac | A01F 12/18 |
| 10,420,277 | B2* | 9/2019 | Holmen | A01F 29/04 |
| 10,820,502 | B2* | 11/2020 | Beavers | A01F 29/12 |
| 2002/0142814 | A1 | 10/2002 | Niermann | |
| 2006/0183519 | A1 | 8/2006 | Benes | |
| 2011/0053668 | A1* | 3/2011 | Weichholdt | A01F 12/40 460/112 |
| 2011/0237316 | A1 | 9/2011 | Isaac et al. | |
| 2013/0263565 | A1 | 10/2013 | Yde | |
| 2016/0374267 | A1* | 12/2016 | Reinecke | A01D 41/1243 239/1 |

FOREIGN PATENT DOCUMENTS

| | | | |
|---|---|---|---|
| EP | 1862055 | A2 | 12/2007 |
| EP | 2036423 | A2 | 3/2009 |
| EP | 3108738 | A1 | 12/2016 |
| WO | 2010149500 | A1 | 12/2010 |

* cited by examiner

SPREADER SYSTEM FOR AN AGRICULTURAL HARVESTER WITH AN OSCILLATING DEFLECTOR

BACKGROUND OF THE INVENTION

The present invention relates to agricultural harvesters, such as combine harvesters, and, more specifically to crop residue spreader systems included in such combine harvesters.

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

During the process of harvesting in a combine, the desired grain is gathered and saved while crop material other than the desired grain is expelled from the combine. The non-grain crop material or crop residue is usually derived from two areas in the combine, the threshing rotor and the cleaning system. The material expelled from the threshing rotor is generally referred to as straw and includes much of the larger plant material such as stalks, stems, cobbs leaves and the like as well as foreign or non-crop material. The material expelled from the cleaning system is generally referred to as chaff and includes much of the finer plant material residue, such as pods, husk fragments and particulates. The combined flows of crop residue to be expelled from the combine can be dealt with in several ways; however, the processes for redepositing the residue material back into the field can be categorized generally as either windrowing or spreading.

In a windrowing process, the crop residue is deposited onto the harvested crop stubble in a continuous narrow stream or windrow, which is much narrower than the harvested swath width. Accumulated in this manner, the windrowed residue material can be picked up easily for baling or other subsequent processing or use.

In a spreading process, a mechanical device distributes the straw and/or chaff evenly across the extent of the combine header cutting width. The material to be spread is usually chopped to a short length so that after spreading the material will break down quickly to add nutrients to the soil and/or to be sufficiently small so as to not interfere with subsequent tilling or seeding operations.

Residue spreaders can be of horizontal and vertical types. A horizontal spreader includes a spreader device with a rotor driven on a generally vertical axis and a plurality of vanes or paddles on the rotor to propel residue in a wide swath behind the combine. Commonly, two such side-by-side rotors are used, the rotors rotating in opposite directions within a housing. After being chopped, the crop residue enters the rotor area through a vertical inlet in the spreader housing, and as the paddles rotate about the axis the residue is propelled towards a tangential outlet of the housing. Typically, the tangential outlet of the housing is formed by a deflector whose orientation and shape determines the spread pattern of the crop residue. It is known to use adjustable structures of the housing and deflector to control the outlet flow of material, by adjusting the size and position of the deflector and of the space between the rotor paddles and the adjustable structures, to achieve a substantially even distribution of the crop residue material across the width of a distribution swath behind the combine. It is desirable to achieve an even distribution of material for more even and consistent residue material breakdown and to facilitate subsequent field tilling and seeding operations.

A vertical spreader includes a rotor driven on a generally horizontal axis and a plurality of vanes or paddles on the rotor to propel residue from the spreader housing. Again, commonly two such side-by-side rotors are used, rotating in opposite directions.

As combine harvesters increase in size and crop processing capability, the width of the header of the combine can increase in order to make fewer passes in a field. As the width of the header increases, so too must the spread width of crop residue behind the combine in order to uniformly cover the field which now is mostly bare of crops. The spread width can be adjusted, for example, by increasing the rotational speed of the rotors and paddles so the crop material is spread a greater distance from the spreader system. The positioning of the deflector is controlled to prevent, for example, crop residue being spread onto standing crop, which would then be collected and reprocessed by the combine.

One particular problem that arises with greater spread widths is the creation of "stripes" of high and low volumes of crop residue along the driving direction of the combine in hard crop conditions. The stripes of high and low crop residue volumes are an uneven thickness of the crop residue, with higher thickness of the crop residue resulting in a high volume stripe and lower thickness of the crop residue resulting in a low volume stripe. The stripes of crop residue distribution can lead to some areas of the field being practically bare of crop residue, with little added nutrients from the residue, while other areas of the field have excess crop residue that can interfere with seeding and tilling.

EP 0 331 784 A1 proposes to intensively chop the crop residue and to drive the chopped material to impellers on both sides of the chopper housing. The impellers eject the material rearwardly along guide vanes, which may be oscillated about a vertical axis to deposit the crop in two meandering stripes behind the harvester. This system forces the crop into narrow streams, which result in an uneven transverse deposit pattern on the field, in particular where wide headers are used.

What is needed in the art is a spreader system which can more evenly distribute crop residue across the width of the combine harvester.

SUMMARY OF THE INVENTION

The present invention provides a spreader system with two spreader devices and a deflector that is driven in an oscillating manner in a parallel direction to one or both rotation axes of the spreader devices.

The invention in one form is directed to a spreader system of an agricultural vehicle for spreading crop residue over a field including: a first spreader device including a plurality of first paddles configured to rotate about a first axis to define a first spread path; a second spreader device including a plurality of second paddles configured to rotate about a second axis to define a second spread path, the second spreader device and the first spreader device being placed side-by-side; a deflector including a first deflector portion for deflecting the first spread path and a second deflector portion for deflecting the second spread path; and a deflector driver connected to the deflector. The spreader system is characterized in that the deflector driver is configured to move the first deflector portion and the second deflector portion of the deflector in a direction generally parallel to the first axis and/or the second axis in an oscillating pattern.

An advantage of the present invention is that the oscillating movement of the deflector portions continuously distributes the high and low crop residue volume stripes, producing a relatively even spreading distribution.

Another advantage is that the deflector driver controlling the oscillating movement of the deflector portions can be retrofitted on existing machines.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus, "grain" refers to that part of the crop material that is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
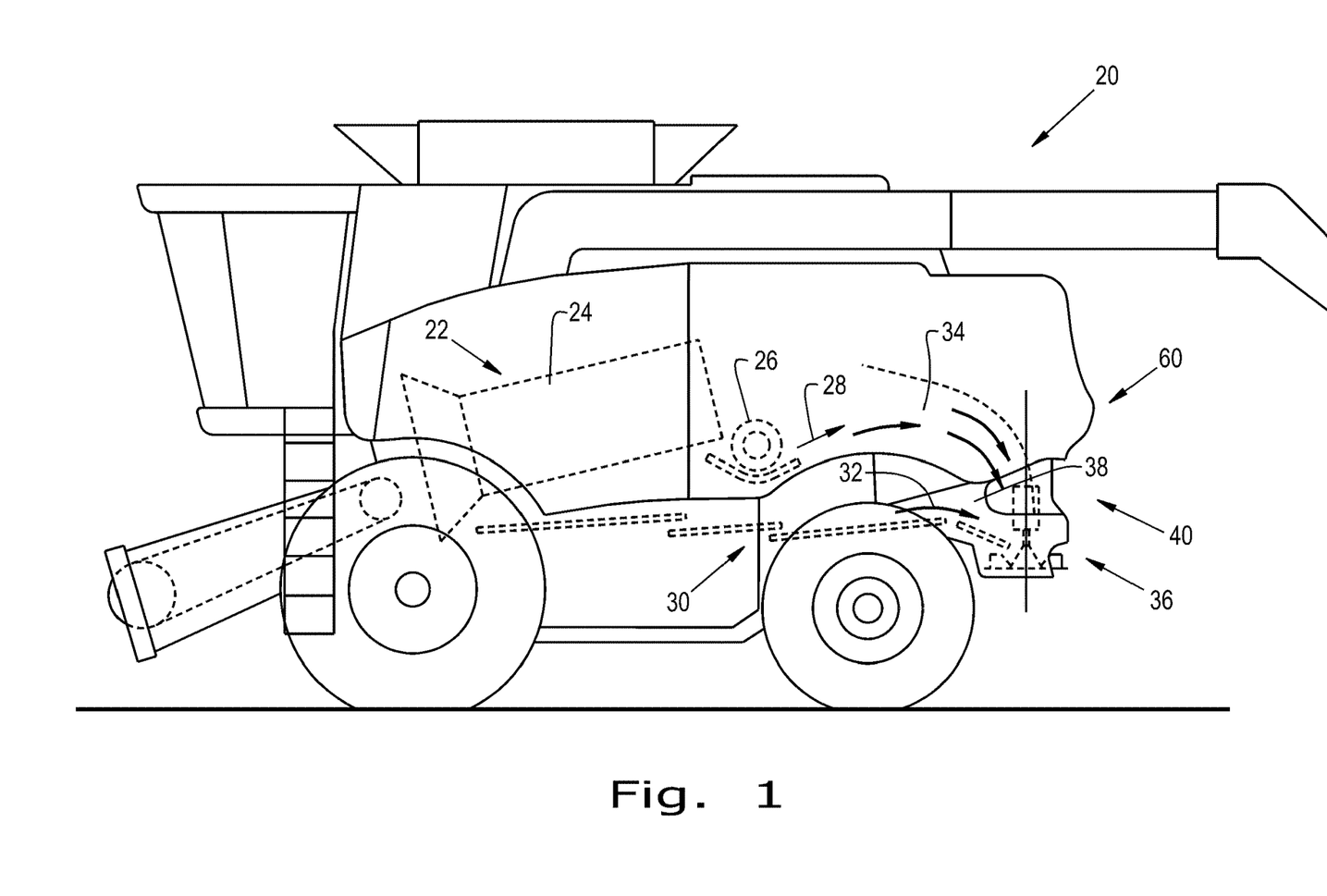
FIG. 1 is a side view of an embodiment of an agricultural harvester in the form of a combine formed according to the present invention.

Referring now to the drawings, FIG. 1 shows an agricultural combine 20, which is representative of a wide variety of agricultural harvesting machines. Combine 20 includes a threshing system 22 having a rotor 24 rotatable in known manner for separating the desirable crop component or grain from straw, stocks and other plant residue. A beater 26 is rotatable for propelling or directing a flow or stream of the plant residue, generally referred to as straw 28, toward the rear of combine 20. A cleaning system 30 receives the threshed crop component from threshing system 22 and removes chaff and other remaining residue such as seedpods, husks and the like, generally referred to as chaff 32, and directs a flow or stream of chaff 32 toward the aft end of combine 20. The straw 28 and chaff 32 pass through a cavity 34 toward a horizontal spreader assembly 36 at a lower opening 38 of the cavity 34. The spreader assembly 36 is part of a crop residue spreader system 40 having a rotor and paddles as to be described herein. It should be appreciated that while a horizontal spreader assembly 36 is shown and described herein, the principles of the present invention can also be applied to vertical or angled spreader assemblies.

Figure 2:
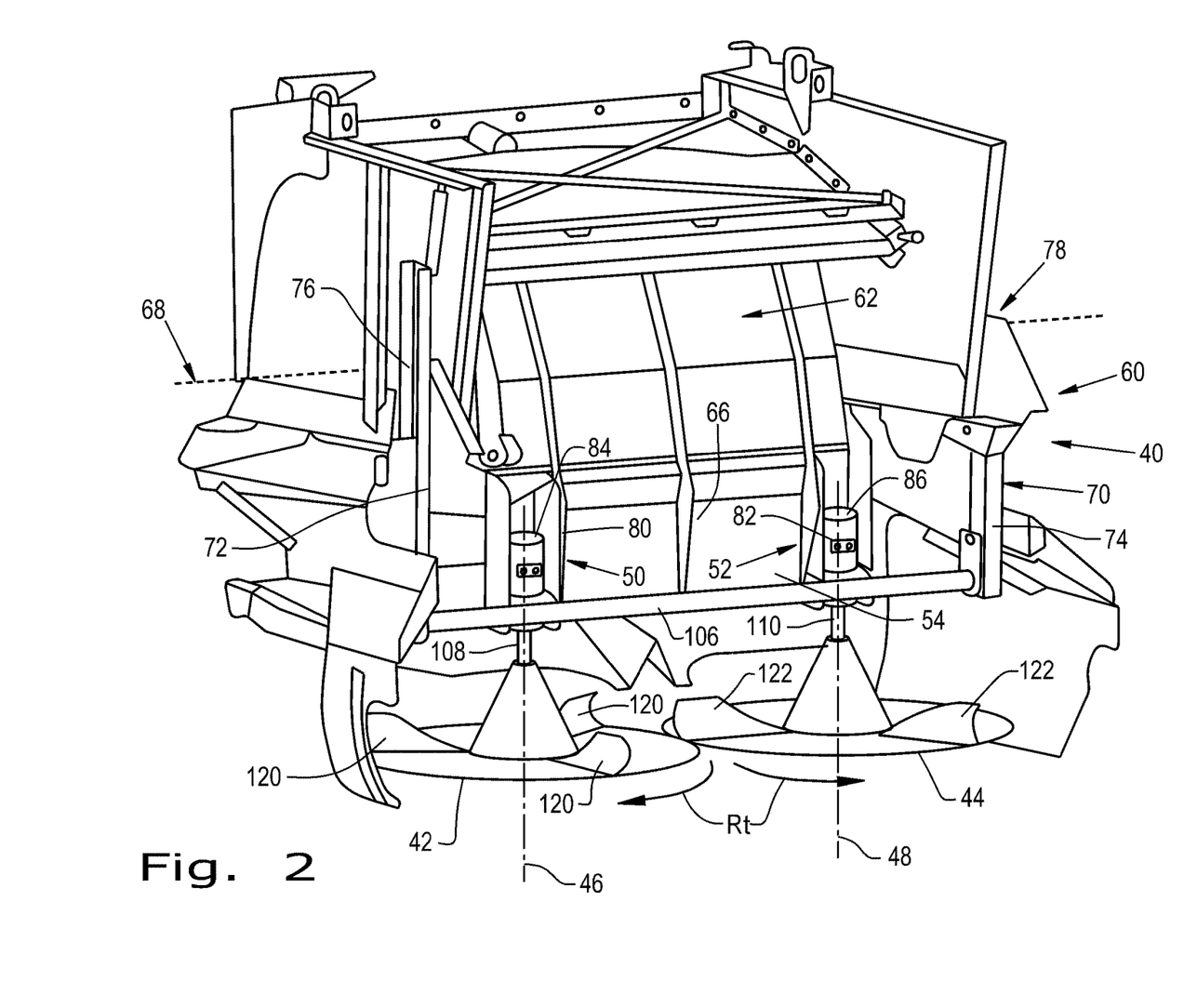
FIG. 2 is a fragmentary perspective view of an aft portion of the harvesting machine shown in FIG. 1.
Figure 3:
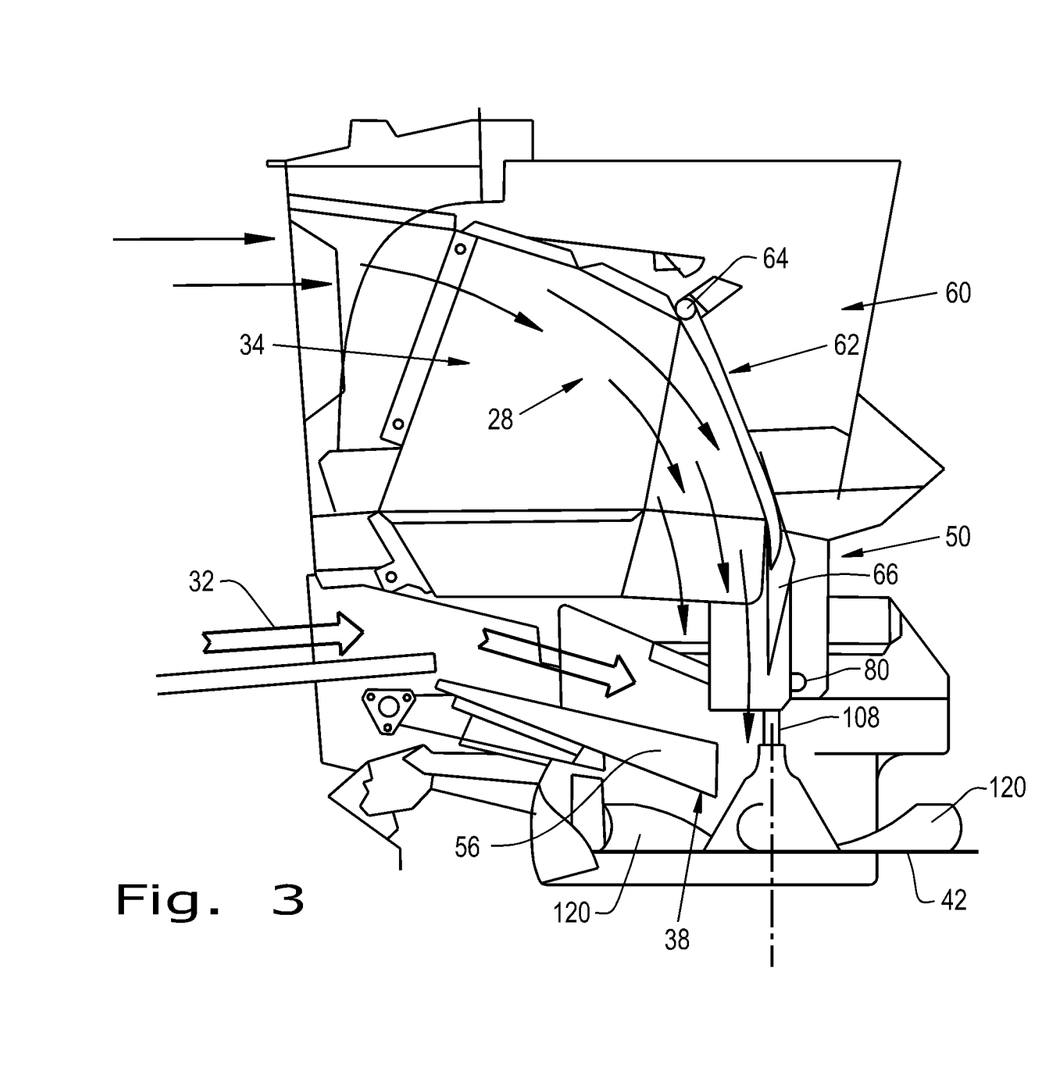
FIG. 3 is a fragmentary side elevational view of the harvesting machine shown in FIGS. 1-2.

Referring now also to FIGS. 2-3, the spreader assembly 36 of spreader system 40 includes side by side first and second spreader devices 42, 44 supported for counter rotation as indicated by arrows R, about generally upstanding rotational axes 46, 48, respectively. The spreader devices 42, 44 are supported and driven in rotations Rt by upstanding first and second spreader drive units 50, 52 positioned above the spreader devices 42, 44, respectively. It should be appreciated that while the spreader devices 42, 44 are shown as being driven about generally vertical first and second spreader drive units 50, 52, the spreader devices 42, 44 can also be driven about generally horizontal or angled spreader drive units, if desired. An open area or space 54 is defined between the laterally positioned spreader drive units 50, 52. A chaff transfer pan 56 can be used for carrying some of the flow of chaff 32 toward the spreader assembly 36.

At an aft end 60 of combine 20, crop residue spreader 40 also can include a pivotally supported deflector door 62 that is pivotal about an axis 64 to adjustably position a lower portion 66 of deflector door 62 in relation to open area 54 defined between drive units 50, 52 of spreader assembly 36. Spreader assembly 36 can be supported for pivotal movement about an axis 68 between a lower, operable position as shown in the drawings for receiving the flows of straw 28 and chaff 32 for spreading thereof over a field, and an upward or stored position (not shown) in which the spreader assembly can be stowed when not in use for spreading. Accordingly, crop residue spreader system 40 further includes a frame 70 and first and second pivot arms 72, 74 movable about first and second pivot points 76, 78, respectively, located on opposite sides of combine 20 along pivot axis 68, the arms 72, 74 also being connected to one another by a cross bar 106.

First and second drive units 50, 52 can include upstanding shields 80, 82 protecting first and second drive motors 84, 86 of drive units 50, 52, respectively. Drive motors 84, 86 are drivingly connected to first and second spreader devices 42, 44 by first and second drive shafts 108, 110, respectively.

As shown in FIGS. 1-3, each of the counter rotating spreader devices 42, 44 includes a plurality of structures to receive and engage straw 28 and chaff 32 to forcefully expel the straw 28 and chaff 32 from the crop residue spreader system 40. In FIGS. 1-3, the structures are indicated generically by pluralities of paddles 120, 122. The number and construction of the paddles 120, 122 included in each respective spreader device 42, 44 can be varied in many different ways, as is known in the art.

Figure 4:
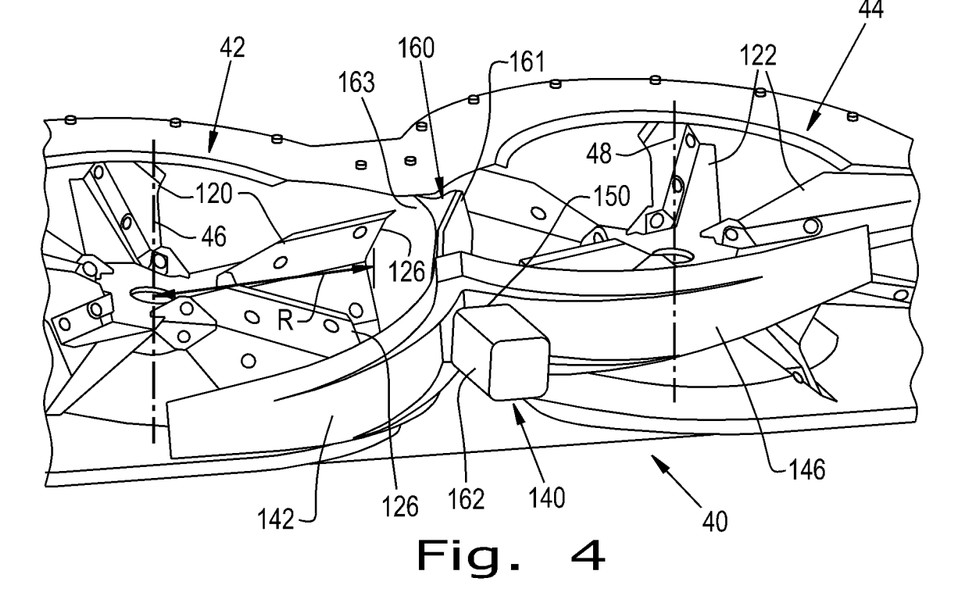
FIG. 4 is a perspective view of an embodiment of a spreader system formed according to the present invention with a deflector driver that rotates a deflector.
Figure 5:
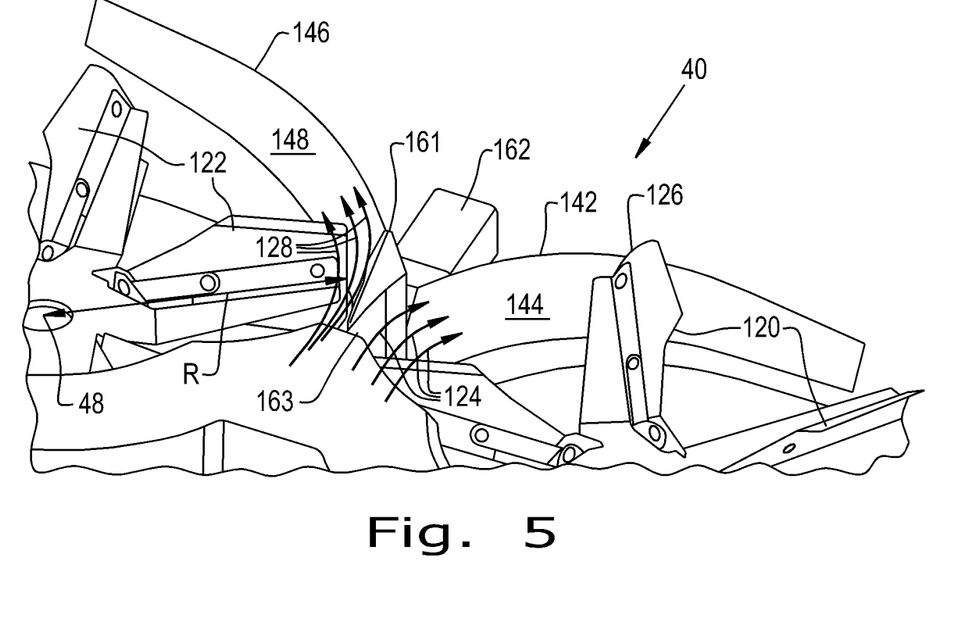
FIG. 5 is another perspective view of the spreader system shown in FIG. 4.

Referring now to FIGS. 4-5, an embodiment of the spreader system 40 formed according to the present invention is shown in greater detail. As can be seen, the spreader system 40 includes the first spreader device 42 having a plurality of first paddles 120 which are configured to rotate about the first axis 46 defined by the drive shaft 108 and the second spreader device 44 having a plurality of second paddles 122 which are configured to rotate about the second axis 48 defined by the drive shaft 110. As shown, the paddles 120, 122 rotate about respective axes 46, 48 which are parallel to each other, but this is not a necessary orientation. The paddles 120 rotate about the first axis 46 to define a first spread path, a portion of which is indicated by arrows 124, that is formed by a series of lines generally tangential to a radius R defined by the first paddles 120 relative to the first axis 46. The spread path 124, therefore, approximates a movement path of carried crop residue from a radial end 126 of each first paddle 120 as the first paddles 120 rotate about the first axis 46. As shown, each of the first paddles 120 has the same radius R. In the event that the first paddles define a plurality of radii relative to the first axis 46, i.e., the first paddles have different lengths relative to the first axis 46, the first spread path can be defined by a series of lines generally tangential to the largest radii of the paddles. Similarly, the second paddles 122 rotate about the second axis 48 to define a second spread path, a portion of which is indicated by arrows 128, that is formed by a series of lines generally tangential to the radius R defined by the second paddles 122 relative to the second axis 48, which can be equal to the radius R of the first paddles 120. The first spreader device 42 and second spreader device 44 can be configured such that the first paddles 120 and the second paddles 122 rotate about their respective axes 46, 48 independently of each other, as shown. This allows the first paddles 120 and second paddles 122 to not only rotate in opposite directions, as shown, but also at different rotational speeds relative to their respective axes 46, 48. Rotating the first paddles 120 and second paddles 122 at differing rotational speeds can compensate for wind speed and direction that can affect the spread distribution of spread crop residue as the agricultural vehicle 20 travels across a field. However, it should be appreciated that other ways of compensating for wind speed and direction can be utilized according to the present invention, and rotating the first paddles 120 and second paddles 122 at differing rotational speeds merely represents one option of doing so.

The spreader system 40 further includes a deflector 140 having a first deflector portion 142 with a first deflector surface 144 in the first spread path 124 and a second deflector portion 146 with a second deflector surface 148 in the second spread path 128. By having the first deflector surface 144 in the first spread path 124 and the second deflector surface 148 in the second spread path 128, the deflector 140 can effectively control deflection, and therefore spread, of crop residue from the paddles 120, 122. In this sense, the first deflector portion 142 is for deflecting the first spread path 124 and the second deflector portion 146 for deflecting the second spread path 128. As shown, the first deflector portion 142 and second deflector portion 146 are integrally formed together and join together at a joining region 150, with the deflector portions 144 and 146 being mirror images of each other about a line (not shown) extending through the joining region 150. It should be appreciated that while the deflector 140 is shown with deflector portions 144 and 146 that are integrally formed mirror images, the deflector 140 can be formed in other ways, which are described herein. The first deflector portion 142 and second deflector portion 146 can both be curved such that their respective deflector surfaces 144 and 148 are curved as well. The curvature of the deflector surfaces 144 and 148, in conjunction with the rotational speed of the paddles 120 and 122, can control the spreading behavior of crop residue from the paddles 120 and 122, as the crop residue from each paddle 120, 122 will travel across the deflector surface 144, 148 in the respective spread path 124, 128 after leaving the paddles 120, 122. The curved shape of the deflector portions 142 and 146, therefore, can be adjusted in many different ways to adjust the spread pattern of crop residue coming off the paddles 120, 122 as the paddles 120, 122 rotate.

A deflector driver 160 is connected to the deflector 140 and drives movement of the deflector 140 to evenly spread crop residue from the spreader devices 42, 44 as the agricultural vehicle 20 travels across a field. As shown in FIGS. 4-5, the deflector 140 is connected to a drive shaft 162 of the deflector driver 160, with the drive shaft 162 being driven by the deflector driver 160 in a rotational, oscillatory pattern. In this sense, the drive shaft 162 defines an axis of rotation of the deflector 140, and thus the two deflector portions 142 and 146. The deflector driver 160 can be, for example, a motor which is adapted to rotate the drive shaft 162 a predetermined number of degrees from a neutral position and then return the drive shaft 162 to the neutral position. Such motors are commonly employed to drive windshield wipers on various types of vehicles and can be readily adapted to use according to the present invention. The deflector driver 160 may be driven by any type of power, such as electrical or mechanical power, to move the deflector 140. The deflector driver 160 can include a housing 161 which contains the driving components (not shown) to rotate the drive shaft 162. For robustness, the housing 161 can be connected to a spreader frame 163 that also supports the spreader devices 42 and 44.

Figure 6:
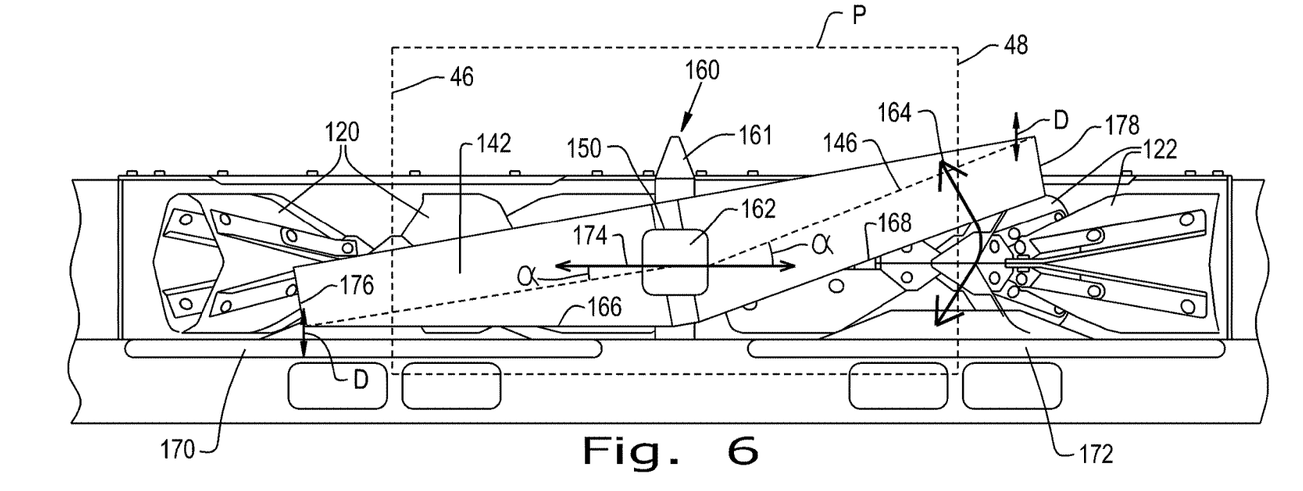
FIG. 6 is a rear view of the spreader system shown in FIGS. 4-5 during oscillating movement of the deflector.
Figure 7:
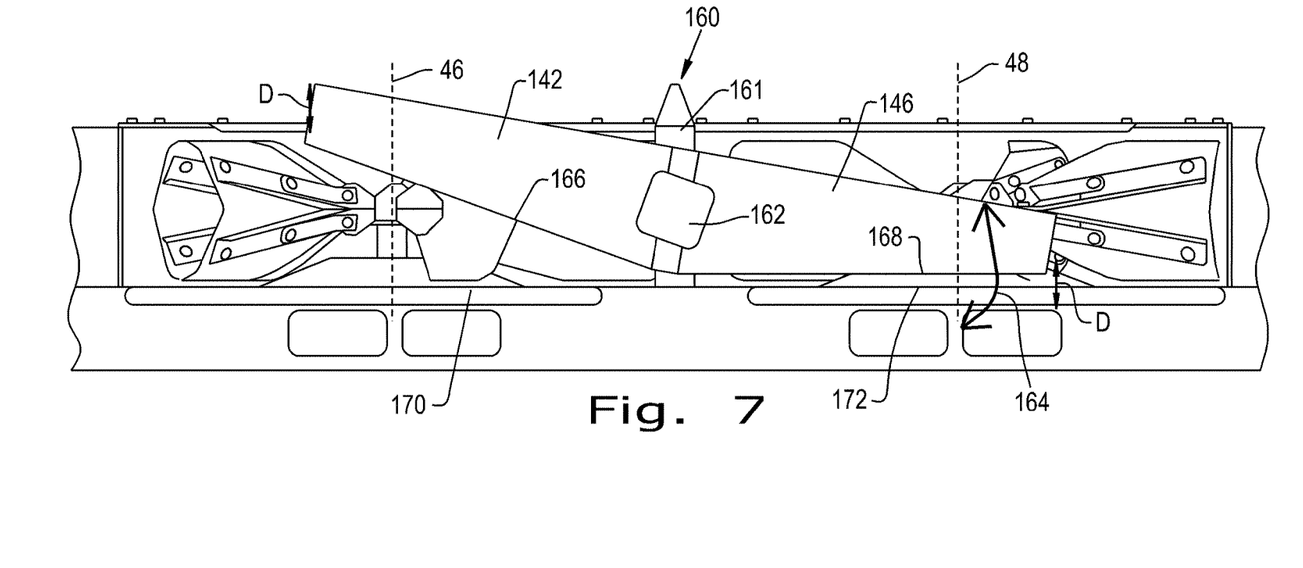
FIG. 7 is another rear view of the spreader system shown in FIGS. 4-6 after further oscillating movement of the deflector from the position shown in FIG. 6.

Referring now to FIGS. 6-7, it can be seen that the drive shaft 162, and thus the axis of rotation of the deflector 140, can be perpendicular to a plane P defined between the axis of rotation 46 of the first paddles 120 and the axis of rotation 48 of the second paddles 122. In the present embodiment, this axis of rotation is extending in a generally longitudinal direction. Rotating the deflector 140 about a drive shaft 162 which is perpendicular to the axes of rotation 46, 48 causes the deflector 140 to move, at least partially, in a direction D which is parallel to the axes of rotation 46, 48. Since the paddles 120, 122 rotate about their respective axis of rotation 46, 48 to spread crop residue, the crop residue will tend to exit the paddles 120, 122 in a perpendicular fashion relative to the axes of rotation 46, 48. Rotationally moving the deflector 140, which is indicated by arrow 164, in an oscillating pattern about the drive shaft 162, which is perpendicular to the axes of rotation 46, 48, causes a varying clearance between bottom edges 166, 168 of the deflector portions 142, 146 and bottom surfaces 170, 172 of the spreader devices 42, 44 as the deflector 140 oscillates. The crop residue moved by the paddles 120, 122 will tend to be pushed along the bottom surfaces 170, 172 toward the deflector portions 142, 146 as the paddles 120, 122 rotate. When the bottom edge of a deflector portion is lowered relative to the bottom surface, such as the bottom edge 166 of deflector portion 142 as shown in FIG. 6, the crop residue from the associated paddles 120 will tend to be deflected away from the center (joining region 150) of the deflector 140, i.e., spread wider. However, when the bottom edge of a deflector portion is raised relative to the bottom surface, such as the bottom edge 168 of deflector portion 146 shown in FIG. 6, the crop residue from the associated paddles 122 will tend to spread more toward the center 150 of the deflector 140, i.e., spread narrower. When the deflector driver 160 moves the deflector 140 to a different position in the oscillation, as shown in FIG. 7, the relative positioning of the bottom edges 166, 168 of the deflector portions 142, 146 can be reversed such that the crop residue moving along the deflector surface 144 of the deflector portion 142 tends to be deflected away from the center 150 and the crop residue moving along the deflector surface 148 of the deflector portion 146 tends be deflected toward the center 150 as the paddles 120, 122 rotate. By constantly oscillating the movement of the deflector portions 142 and 146 in this fashion, stripes of crop residue being formed on the field can be reduced or avoided by constantly varying the deflection pattern of the crop residue relative to the center 150 of the deflector 140. Further, since the clearance between the bottom edges 166, 168 of the deflector portions 142, 146 constantly changes relative to the bottom surfaces 170, 172 of the spreader devices 42, 44, the amount of crop residue which spreads below the bottom edges 166, 168 without traveling entirely along the deflector surfaces 144, 148 also varies during the oscillation. As can be seen in comparing FIGS. 6 and 7, the deflector driver 160 can rotate the deflector portions 142, 146 with an oscillation amplitude 2α of about 60° from a neutral position, indicated as a line 174, but it is also contemplated that the oscillation amplitude 2α can be other values between 30° and 120°.

To alter the spread characteristics of the crop residue as the deflector 140 oscillates, each deflector portion 142, 146 can be formed with a varying cross-section from the joining region 150 to a respective lateral end 176, 178. As can be seen in FIGS. 6-7, the deflector portions 142, 146 can both have a maximum cross-sectional area adjacent to the joining region 150 which decreases toward the respective lateral ends 176, 178 so each deflector portion 142, 146 has a minimum cross-sectional area adjacent to its lateral end 176, 178. Such a shape can allow the bottom edges 166, 168 of the deflector portions 142, 146 to be substantially parallel with the bottom surfaces 170, 172 of the spreader devices 42, 44 when the deflector portions 142, 146 are at the point in the oscillation where the bottom edges 166, 168 have a minimum clearance relative to the bottom surfaces 170, 172.

Figure 8:
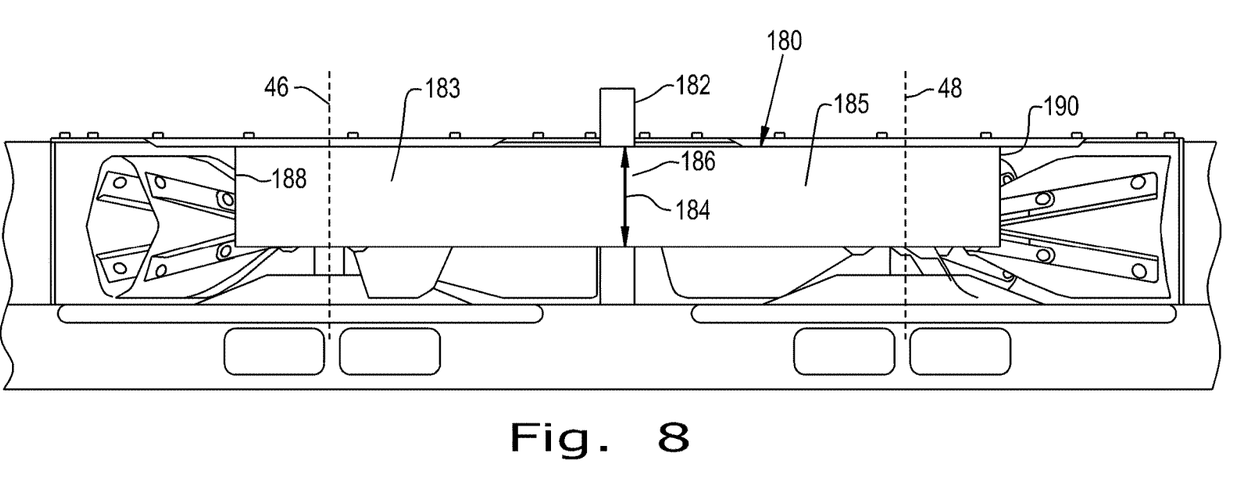
FIG. 8 is a rear view of another embodiment of a spreader system formed according to the present invention with a deflector driver which reciprocates a deflector.
Figure 9:
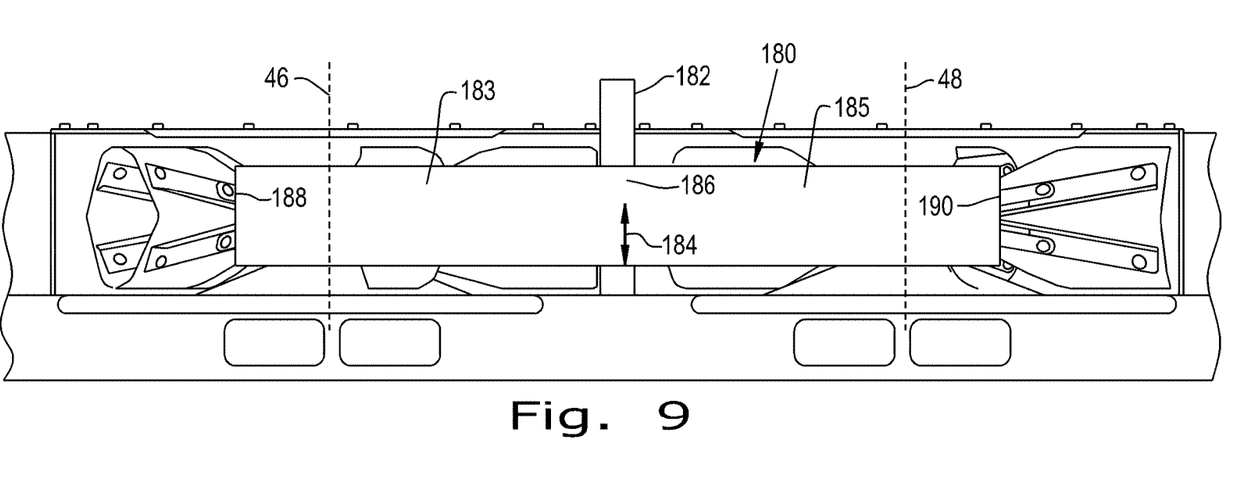
FIG. 9 is another rear view of the spreader system shown in FIG. 8 after reciprocating movement of the deflector from the position shown in FIG. 8.

While the deflector driver 160 shown in FIGS. 4-7 rotates the deflector 140 about a drive shaft 162 defining an axis of rotation of the deflector 140, a similar effect can also be obtained by linearly moving the deflector in the direction D which is parallel to one or both of the axes of rotation 46, 48 of the paddles 120, 122. Referring now to FIGS. 8-9, such an embodiment is shown with a deflector 180 connected to a deflector driver 182 which reciprocates the deflector 180 along a line 184 which is parallel to one or both of the axes of rotation 46, 48 of the paddles 120, 122. As is known, a reciprocating movement is a linear oscillation consisting of two oppositely directed strokes, with many types of drivers which can create reciprocating movement being known. Each stroke of the reciprocating movement can be adjusted to achieve a desired spread pattern. As the reciprocating movement of the deflector 180 does not change the angular position of the deflector 180 as a rotation does, the deflector 180 can be formed to have a first deflector portion 183 and a second deflector portion 185 each having a curved shape, similar to the deflector 140, except that the deflector 180 has a constant cross-sectional area between a joining region 186 of the deflector 180 and opposite lateral ends 188, 190 of the deflector 180. However, it should be appreciated that the deflector 180 can also be formed to have a similar shape to the deflector 140 or other shapes if desired.

For any of the previously described embodiments, the oscillation speed of the deflector 140, 180 can be adjustable based on a variety of criteria. As used herein, the "oscillation speed" refers to the number of oscillations the deflector 140, 180 undergoes in a given unit of time, such as 1 oscillation per second. For example, it may be desirable to tie the oscillation speed of the deflector 140, 180 to the rotational speed of the first paddles 120 and/or the second paddles 122. It may be desirable, for example, to increase the oscillation speed of the deflector 140, 180 when the rotational speed of the first paddles 120 and/or the second paddles 122 increases, as the speed of the carried crop residue will also increase. Similarly, the oscillation speed of the deflector 140, 180 may be decreased when the rotational speed of the first paddles 120 and/or the second paddles 122 decreases. It should be appreciated that adjusting the oscillation speed of the deflector 140, 180 based the rotational speed of the paddles 120, 122 is an exemplary criteria only, and the oscillation speed of the deflector 140, 180 can be based on many criteria other than rotational speed of the paddles 120, 122 according to the present invention.

The invention claimed is:

1. A spreader system of an agricultural vehicle for spreading crop residue over a field, comprising:
    a first spreader device including a plurality of first paddles configured to rotate about a first axis to define a first spread path;
    a second spreader device including a plurality of second paddles configured to rotate about a second axis to define a second spread path, the second spreader device and the first spreader device located side-by-side;
    a deflector including a joining region, a first deflector portion for deflecting the first spread path and defining a first lateral end, and a second deflector portion for deflecting the second spread path and defining a second lateral end located on an opposing side of the joining region from the first lateral end; and
    a deflector driver connected to the deflector, wherein the deflector driver is configured to rotate the first deflector portion and the second deflector portion about an axis of rotation,
    wherein the deflector driver is configured to move the first deflector portion and the second deflector portion of the deflector in conjunction with one another between a first position in which the first lateral end is at least partially below the second lateral end and a second position in which the second lateral end is at least partially below the second lateral end.

2. The spreader system of claim 1, wherein the deflector driver is configured to rotate the first deflector portion and the second deflector portion about the axis of rotation with an oscillation amplitude of between 30° and 120°.

3. The spreader system of claim 1, wherein the axis of rotation extends in a generally longitudinal direction.

4. The spreader system of claim 1, wherein the first deflector portion is connected to the second deflector portion and the second deflector portion is a mirror image of the first deflector portion.

5. The spreader system of claim 4, wherein the first deflector portion and the second deflector portion are both curved.

6. The spreader system of claim 4, wherein the first deflector portion and the second deflector portion are integrally formed together.

7. The spreader system of claim 1, wherein the first deflector portion or the second deflector portion has a maximum cross-sectional area adjacent to the joining region.

8. The spreader system of claim 7, wherein the first deflector portion or the second deflector portion has a decreasing cross-sectional area away from the joining region.

9. The spreader system of claim 1, wherein the plurality of first paddles are configured to rotate independently of the plurality of second paddles.

10. The spreader system of claim 1, wherein the plurality of first paddles and the plurality of second paddles are configured to counter-rotate relative to each other.

11. The spreader system of claim 1, wherein the deflector driver is configured to reciprocate the first deflector portion and the second deflector portion in the direction generally parallel to the first axis or the second axis.

12. The spreader system of claim 1, wherein the first axis and the second axis are generally vertical axes.

13. The spreader system of claim 1, wherein the first axis and the second axis are generally parallel to each other.

14. An agricultural vehicle comprising:
 a threshing and cleaning system for separating crop residue from collected crop material; and
 a spreader system for spreading the crop residue over a field, the spreader system comprising:
  a first spreader device defining a first bottom surface and including a plurality of first paddles configured to rotate about a first axis to define a first spread path;
  a second spreader device defining a second bottom surface and including a plurality of second paddles configured to rotate about a second axis to define a second spread path, the second spreader device and the first spreader device located side-by-side;
  a deflector including a first deflector portion for deflecting the first spread path defining a first bottom edge and a second deflector portion for deflecting the second spread path defining a second bottom edge; and
  a deflector driver connected to a joining region of the deflector,
  wherein the deflector driver is configured to move the joining region to cause the first deflector portion and the second deflector portion of the deflector to rotate in conjunction with one another in opposing directions relative to the first and second bottom surfaces.

15. The spreader system of claim 14, wherein a first clearance is defined between the first bottom edge and the first bottom surface when the deflector driver moves the first deflector portion to a first position and a second clearance is defined between the first bottom edge and the first bottom surface when the deflector driver moves the first deflector portion to a second position, the first clearance varied from the second clearance.

16. A spreader system of an agricultural vehicle for spreading crop residue over a field, comprising:
 a first spreader device including a plurality of first paddles configured to rotate about a first axis to define a first spread path;
 a second spreader device including a plurality of second paddles configured to rotate about a second axis to define a second spread path, the second spreader device and the first spreader device located side-by-side;
 a deflector including a first deflector portion for deflecting the first spread path, a second deflector portion for deflecting the second spread path, and a joining region; and
 a deflector driver connected to the joining region of the deflector,
 wherein the deflector driver is configured to move the first deflector portion and the second deflector portion of the deflector between a first position and a second position in conjunction with one another in a reciprocating manner that causes opposing movement of the first deflector portion from the second deflector portion in conjunction with one another.

17. The spreader system of claim 16, wherein the deflector driver is configured to rotate the first deflector portion and the second deflector portion about the axis of rotation with an oscillation amplitude of between 30° and 120°.

18. The spreader system of claim 16, wherein movement of the first deflector portion causes movement of the second deflector portion.

19. The spreader system of claim 16, wherein the first deflector portion or the second deflector portion has a maximum cross-sectional area adjacent to the joining region.

* * * * *